US007148034B2

(12) United States Patent
Schlothauer et al.

(10) Patent No.: US 7,148,034 B2
(45) Date of Patent: Dec. 12, 2006

(54) BIOACTIVE WHEY PROTEIN HYDROLYSATE

(75) Inventors: Ralf-Christian Schlothauer, Palmerston North (NZ); Linda May Schollum, Palmerston North (NZ); Julian Robert Reid, Palmerston North (NZ); Stephanie Adele Harvey, Palmerston North (NZ); Alistair James Carr, Palmerston North (NZ); Rachel Lois Fanshawe, Wellington (NZ)

(73) Assignee: New Zealand Dairy Board (NZ)

( * ) Notice: Subject to any disclaimer, the term of this patent is extended or adjusted under 35 U.S.C. 154(b) by 135 days.

(21) Appl. No.: 10/070,406

(22) PCT Filed: Sep. 11, 2001

(86) PCT No.: PCT/NZ01/00188

§ 371 (c)(1),
(2), (4) Date: Oct. 7, 2002

(87) PCT Pub. No.: WO02/19837

PCT Pub. Date: Mar. 14, 2002

(65) Prior Publication Data

US 2004/0086958 A1 May 6, 2004

(51) Int. Cl.
*C12P 21/06* (2006.01)
(52) U.S. Cl. .................... 435/68.1; 530/300; 930/40
(58) Field of Classification Search ............... 435/68.1; 530/300; 930/40
See application file for complete search history.

(56) References Cited

U.S. PATENT DOCUMENTS

| 3,970,520 | A |   | 7/1976  | Feldman et al. |
| 4,358,464 | A |   | 11/1982 | Soehnlen |
| 4,847,096 | A | * | 7/1989  | Mellqvist et al. ............. 426/41 |
| 5,589,357 | A |   | 12/1996 | Martinez et al. ........... 435/68.1 |
| 5,952,193 | A |   | 9/1999  | Shinamura et al. |
| 6,060,269 | A |   | 5/2000  | Chatterton et al. |
| 6,630,320 | B1 | * | 10/2003 | Davis et al. .................. 435/24 |
| 2002/0012720 | A1 |   | 1/2002  | Chen |

FOREIGN PATENT DOCUMENTS

| EP | 065663 | 12/1982 |
| EP | 117047 | 8/1984 |
| EP | 0322589 | 7/1989 |
| EP | 474 506 A1 | 9/1991 |
| EP | 269593 | 4/1992 |
| EP | 474506 B1 | 5/1998 |
| FR | 2309154 | 11/1976 |
| JP | 04282400 | 10/1992 |
| JP | 8056568 | 3/1996 |
| JP | 10033115 | 2/1998 |
| WO | WO 9113554 A1 | 9/1991 |
| WO | WO 9965326 | 12/1991 |
| WO | WO 9221248 | 12/1992 |
| WO | WO 9304593 | 3/1993 |
| WO | WO 9324020 A1 | 9/1993 |
| WO | WO 99/65326 | * 12/1999 |
| WO | WO 00/42863 | 7/2000 |

OTHER PUBLICATIONS

Ju et al (J. Dairy Sci. 78:2119-2128 (1995)).*
Abubakar et al., "Structural analysis of new antihypertensive peptides derived whey protein by proteinase K digestion", J. Dairy Sci 81(12):3131-3138 (1998).
Bernal and Jelen "Effectiveness of lactose hydrolysis in Cottage cheese Whey for the development of whey drinks" *Milchwissenchaft* 44:222-225 (1989).
Castro et al., "Proteolysis of why proteins by a Bacillus subtilis enzyme preparation" *Int Dairy J.* 6:285-94 (1996).
Cushman D W & Cheung HS. "Spectrophotometric assay and properties of the angiotensin converting enzyme in rabbit lung" *Biochem. Pharmacol.* 20:163 7-1648 (1971).
Frister, Meisel & Schlimme "OPA method modified by use of N,N-dimethyl-2-mercaptoethylammoniumchlorine as thiol component[ID]"*Freesenius Z Anal Chem* 330:631-633 (1988).
Maubois et al., "Les peptides du lait a activite physiologique III. Peptides du lait a effect cardiovasculaire: activites antithrombotique" *Lait* 71,249:955 (1991).
Mullaly et al. "Identification of a novel angiotensin-I-converting enzyme inhibitory peptide corresponding to a tryptic fragment of bovine b-lactoglobulin" *Federation of European Biochemical Societies Letters* 402:99-101 (1997).
Nakamura Y. Yamamoto N. et al., Antihypertensive effect of peptides derived from casein by an extracellular proteinase form Lactobacillus helveticus CP790. *Journal of Dairy Sciences* 77:917-922 (1994).
Roy, G. "Bitterness: reduction and inhibition." *Trends in Food Science and Technology* 3:85-91 (1992).
Roy, G. "Modifying bitterness: Mechanism, ingredients and applications" Technomic Publishers, Lancaster, UK (1997).
Yamamoto et al. "Antihypertensive peptides derived from food proteins" *Biopolymers* 43:129-134 (1997).
Mutilangi et al., "Functional Properties of Hdyrolysates from Proteolysis of Heat-denatured Whey Protein Isolate", Journal of Food Science, 1996, pp. 270-303, vol. 61, No. 2.
Pihlanto-Leppalia et al., "Angiotensin I-converting enzyme inhibitory properties of whey protein digests : concentration and characterization of active peptides", Journal of Dairy Research, 2000, pp. 53-64.

* cited by examiner

*Primary Examiner*—Cecilia J. Tsang
*Assistant Examiner*—Susan Hanley
(74) *Attorney, Agent, or Firm*—Knobbe Martens Olson & Bear LLP

(57) ABSTRACT

The present invention relates to a process of preparing a whey protein hydrolysate from a WPI substrate having improved flavour, functionality and ACE-I inhibiting properties.

32 Claims, 2 Drawing Sheets

BIOACTIVE WHEY PROTEIN HYDROLYSATE

TECHNICAL FIELD

This invention relates to a process for producing improved hydrolysed whey protein products which are substantially free of bitter flavours and which contain bioactive peptides. The products of the process have high digestibility and good organoleptic properties. The products have a bland taste and are free of soapy or brothy flavours. The improved hydrolysed whey protein products are useful sources of bioactive peptides for incorporation into functional foods.

BACKGROUND ART

A number of food ingredients and foodstuffs have been produced from the hydrolysis of a protein source such as the milk proteins, casein and whey proteins.

Hydrolysed protein foodstuffs may have advantages over non-hydrolysed protein foodstuffs in a number of areas of health care. For example, it is known that enzymatically hydrolysed proteins are less allergenic. They are also more rapidly digested and absorbed than whole proteins. Foodstuffs containing hydrolysed proteins are also useful in the alimentation of hospital patients with digestive diseases for example.

Hydrolysis of whey proteins and caseins is known to release bioactive peptides that can exhibit a number of physiological effects (Maubois et al, 1991; EP 4745506). A number of publications describe such bioactive peptides, for example, ACE inhibiting peptides which have antihypertensive properties have been released through an enzymatic treatment of β-lactoglobulin and whey protein concentrates (Mullally et al, 1997). ACE inhibitory peptides are also found in sour milk and in hydrolysates of α, and β casein (JP 4282400; Nakamura et al 1994, Yamamoto 1997).

EP 4745506 discloses the hydrolysis of the milk protein lactoferrin in whey to release lactoferrin which acts as an antimicrobial agent useful for treating diarrhoea, athlete's foot, eye infections, mastitis etc in humans and animals.

However, the hydrolysis of most food proteins, especially the hydrolysis of whey and casein containing products, is known to generate bitterness. This causes palatability problems particularly when attempting to formulate orally ingestible products incorporating milk protein hydrolysates as a source of bioactive peptides.

In the field of protein hydrolysis one or both of two approaches are commonly used for controlling or removing bitterness in protein hydrolysates to increase palatability of the products.

The extensive hydrolysis of the protein substrate is known to reduce bitterness in milk protein hydrolysates (EP 065663; EP 0117047; U.S. Pat. No. 3,970,520). Less bitter products are produced relatively easily and cheaply in this way. However, extensive hydrolysis reduces the chain lengths of all peptides, including the bioactive peptides of interest. Extensive hydrolysis of the protein substrate destroys the functional and biological activity of the peptide of interest. In addition soapy and brothy off-flavours often develop, with the consequence that the palatability of the final product remains poor compared to the original bland tasting protein substrate. A final disadvantage is that for some hydrolysates the bitterness is only partially removed (Roy 1992 and 1997).

A second common method for the control of bitterness in protein hydrolysates is to use debittering enzymes, in particular those sourced from *Aspergillus oryzae*.

"Bitterness" generation in protein hydrolysis is thought to be due to the presence of large hydrophobic 'bitter' peptides. Debittering eyes selectively hydrolyse bitter peptides present in the protein hydrolysates. A worker skilled in the art can—by the judicious selection of debittering enzymes and the conditions of treatment—effectively debitter milk protein hydrolysates leaving intact the particular bioactive peptides of interest. However, use of debittering enzymes makes the process more expensive, and preservation of some of the bioactive peptide is not easily or successfully achieved. A further disadvantage is that debittering enzymes treatments have a tendency to release free amino acids into the final product and, as a consequence, the hydrolysates develop unpleasant brothy or soapy flavours (Roy 1992 and 1997).

The various methods of debittering the protein hydrolysates result in additional process steps and add costs to the manufacture of the final product. In addition the final product also becomes overbalanced in its supply of free amino acids.

It would be most advantageous if a process for hydrolysing protein could be developed which releases bioactive peptides of interest and which limits the formation of bitter peptides and free amino acids, thereby allowing the original bland taste of the milk protein substrates to be retained.

Some bioactive peptides—in particular the antihypertensive peptides—are relatively stable during protein hydrolysis and are released very early during the hydrolysis of the milk protein substrate as shown in FIG. 1.

The bitter flavours of milk protein hydrolysates can be improved by adding sugars or by hydrolysing natural sugars, such as lactose, already present in the milk protein substrate (Bernal and Jelen, 1989). For example sour wheys and cheese wheys are made more palatable when they have been sweetened by β-galactosidease and lactase hydrolysis of lactose (FR 2309154; U.S. Pat. No. 4,358,464; JP 8056568).

In order to achieve a high flavour acceptability for a hydrolysed protein product which contains bioactive peptides, precise control of hydrolysis is required to prevent bitterness occurring.

A common method of termination of hydrolysis is by deactivation of the enzymes, usually by thermal deactivation at high temperatures, typically >90–100° C. for an extended period of time. However, this method cannot be used to stop the hydrolysis of whey proteins as any intact unhydrolysed whey proteins remaining in the mixture would denature and precipitate making the final product less soluble and less acceptable for the use as a food ingredient.

Such a problem was overcome in. WO 99/65326 which discloses a process of mid hydrolysis of sweet whey or sweet whey protein concentrate (WPC) to produce hydrolysates containing bioactive peptides having one or more of the following properties:

antihypertensive ACE-I activity bifidus growth promoting activity non-gluey, non-bitter flavour pleasant to slightly sweet taste good organoleptic properties.

The present invention uses a different whey protein-containing substrate to that used in WO 99/65326 although a similar hydrolysing process is used. Surprisingly, the use of this different substrate results in a hydrolysate which shows dramatic improvements in the above mentioned properties of the whey hydrolysates, particularly in the antihypertensive ACE-I activity, flavour and functionality of the product.

It is broadly to the process of hydrolysing a different whey protein containing substrate and the novel hydrolysate produced by this process that the present invention is directed.

SUMMARY OF THE INVENTION

Accordingly the invention may be said broadly to consist in a process for preparing an improved whey protein hydrolysate containing bioactive peptides comprising hydrolysing a whey protein isolate (WPI) with one or more enzymes characterised in that:
i) the enzyme is a heat labile protease;
ii) the hydrolysis is conducted at a temperature of between about 30° C. and 65° C. at a pH of about 3.5 to about 9.0 when said enzyme is a neutral protease, at a pH of about 2.5 to about 6.0 where said enzyme is an acid protease; and at a pH of about 5.0 to about 10.0, where said enzyme is an alkaline protease;
iii) the hydrolysis is terminated when a degree of hydrolysis of no greater than about 10% has been reached;
iv) the hydrolysis is terminated by deactivating said one or more enzymes; and
v) the conditions for said step iv) are sufficiently mild to avoid substantial denaturation of peptides or residual proteins in said hydrolysate;

wherein the product produced by thee process is highly soluble.

By WPI is meant a whey protein isolate produced by any method known in the art. Preferably the WPI is produced by a method of ion exchange from a whey protein concentrate, such as a cheese, acid, or lactic whey protein concentrate, as would be appreciated by a person skilled in the art.

By heat labile is meant hat the enzyme is susceptible to irreversible deactivation at relatively moderate temperatures as would be appreciated by a person skilled in the art.

Preferably the enzyme is selected from the group consisting of Protease P6, Protease A, Protease M, Peptidase, Neutrase, Validaise, AFP 2000, and any other heat labile protease.

The enzyme hydrolysis step may be carried out under conditions which are suitable for the particular enzyme used as would be understood by a person skilled in the art.

The whey protein isolate (WPI) may be hydrolysed at a concentration in the range of from about 5–35% solids and the enzyme or enzyme mixtures may be added to give an enzyme to substrate ratio between about 0.01% and about 3% w/w total solids, preferably between about 0.01% and about 1.0% w/w total solids.

WPI treated with acid proteases may be hydrolysed at a pH of between about 2.5 and about 6.0, preferably between a pH of about 3.0 and about 5.0.

WPI treated with neutral proteases may be hydrolysed at a pH of between about 3.5 and about 9.0, preferably between a pH of about 6.0 and about 8.0.

WPI treated with alkaline proteases may be hydrolysed at a pH range of between about 5.0 and about 10.0, preferably between a pH of about 6.0 and about 8.0.

The protein hydrolysis may be carried out at a temperature range of from between about 30–65° C., preferably from about 5060° C.

In one embodiment the one or more enzymes used to selectively hydrolyse the WPI may be immobilised on an inert support during said hydrolysis step ii) wherein said inert support; is Roelun Eupergit, carrageenan particles, chitosan particles or any other suitable inert support material. This enzyme system may then be used in a stirred tank or fixed bed reactor or on a membrane or hollow fiber reactor to carry out the hydrolysis reaction.

The enzyme(s) used for hydrolysis may be cross linked to the said inert support prior to the hydrolysis reaction.

The hydrolysate of the present invention is referred to as a "mild" hydrolysate whereby the degree of hydrolysis, i.e. the percentage of peptide bonds cleaved by enzymic action is less than about 10%. Thus, although the hydrolysate may still contain large peptide chains that may be slightly denatured, the final hydrolysate product is highly soluble.

The degree of hydrolysis of the WPI substrate is preferably from about 3% to about 10%, most preferably from about 3% to about 5% before the hydrolysis is terminated.

Hydrolysis is determined by the enzyme deactivate step iv). Preferably, enzyme deactivation comprises heat deactivation.

The heat deactivation may comprise heating said hydrolysate for up to about ten seconds to a temperature of up to about 100° C.

When the hydrolysis is conducted at a temperature of below 65° C., the heat deactivating step is conducted at about 65° C. to about 70° C. for from about 10 seconds to about 15 minutes.

When the hydrolysis is conducted at a temperature of below 60° C., the heat deactivating step is conducted at about 60° to about 65° C. for from about 10 seconds up to about 30 minutes.

Alternatively, the enzyme deactivating step iv) comprises altering the pH of said whey protein-containing substrate to a pH at which said protease is not active.

According to one option, depending on the enzyme(s) used, the enzyme or enzyme mixture may also be deactivated by the evaporation and drying procedures.

According to another option the enzyme or enzyme mixture may also be deactivated with or without a prior pH change.

Alternatively, the enzymes may be deactivated by simply removing them from the reaction mixture. For example, when the one or more enzymes used to selectively hydrolyse the WPI are immobilised on an inert support, such as by cross-linking to said inert support prior to the hydrolysis reaction, they may be subsequently separated out of the hydrolysis reaction by membrane filtration in order to achieve deactivation.

Alternatively, the enzyme(s) may be separated out of the hydrolysis mixture with the use of an ultrafiltration membrane with a nominal molecular weight cutoff in the range of about 10–500 kDa, preferably about 10–200 kDa, once hydrolysis is complete.

In a preferred embodiment, termination of the hydrolysis is achieved by deactivating the one or more whey protein hydrolysis enzymes by firstly changing the pH of the reaction mixture to a pH in which the enzyme(s) is either inactive or less active, and/or heating the reaction mixture to a comparatively mild temperature using a heat exchanger to denature the enzyme but not the intact whey proteins in the substrate. A suitable temperature range which would denature the enzymes is in the order of about 55–70° C., preferably about 65° C.

After hydrolysis and optional deactivation or removal of enzymes, the hydrolysate may optionally be subjected to reverse osmosis under conditions whereby salt and water are removed from the hydrolysate. The purified desalted hydrolysate comprising whey proteins, polypeptides and bioactive peptides is then recovered.

Optionally the hydrolysed WPI containing the bioactive peptide fraction can be purified with a UF membrane of about 5–200 kDa cut off, preferably about 10–50 kDa cut off. The bioactive peptides, and other peptides are recovered in the permeate.

According to another option ion exchange or hydrophobic adsorption or hydrophobic interaction chromatography or combinations of these processes may be used to recover the hydrolysed bioactive fraction from the hydrolysates in an enriched form.

In another embodiment the invention consists in a whey protein hydrolysate containing one or more bioactive peptides selected from the group consisting of SAP (SEQ ID NO: 1), MKG (SEQ ID NO: 2), ALPMH (SEQ ID NO: 3), LIVTQ (SEQ ID NO: 4), VSLPEW (SEQ ID NO: 5), INYWL (SEQ ID NO: 6), LKPTPEGDLEIL (SEQ ID NO: 7) and LKGYGGVSLPEW (SEQ ID NO: 8).

Preferably the whey protein hydrolysate comprises at least one bioactive peptide selected from the group consisting of LIVTQ (SEQ ID NO: 4), MKG (SEQ ID NO: 2) and ALPMH (SEQ ID NO: 3), in combination with at least one bioactive peptide selected from the group comprising SAP (SEQ ID NO: 4), VSLPEW (SEQ ID NO: 5), INYWL (SEQ ID NO: 6), LKPTPEGDLEIL (SEQ ID NO: 7) and LKGYGGVSLPEW (SEQ ID NO: 8).

According to a further aspect the present invention provides a pharmaceutical composition comprising one or more of the bioactive peptides produced in the process of the invention together with a pharmaceutically acceptable carrier. Preferably said pharmaceutical composition comprising at least the bioactive peptide MKG (SEQ ID NO: 2) together with a pharmaceutical acceptable carrier.

According to a still further aspect, the present invention provides a method of treating or preventing hypertension in a mammal comprising administering an effective amount of a bioactive peptide produced by hydrolysing WPI according to the process of the invention to a mammal in need thereof.

According to a still flier aspect, the present invention provides a use of one or more bioactive peptides produced by the process of the invention in the manufacture of a medicament for treating or preventing hypertension in a patient in need of such treatment. Preferably said bioactive peptide is MKG (SEQ ID NO: 2).

The present invention further provides a non-bitter, highly soluble WPI hydrolysate product prepared by the process of the invention, wherein the degree of hydrolysis of WPI is about 3% to about 10%. The mean particle size of whey proteins in the product may be less than about 30 microns, preferably less than about 3 microns.

In a further embodiment the invention provides a food product containing a WPI hydrolysate of the invention.

The invention further comprises a method of reducing systolic blood pressure in a subject, wherein said method comprises administering an effective amount of the novel WPI hydrolysate or food product containing said hydrolysate of the invention to a subject in need thereof.

The invention further comprises one or more peptides selected from the group comprising SAP (SEQ ID NO: 1), MKG (SEQ ID NO: 2), ALPMH (SEQ ID NO: 3), LIVTQ (SEQ ID NO: 4), VSLPEW (SEQ ID NO: 5), INYWL (SEQ ID NO: 6), LKPTPEGDLEIL (SEQ ID NO: 7) and LKGYGGVSLPEW (SEQ ID NO: 8).

The invention further comprises at least one bioactive peptide selected from the group consisting of LIVTQ (SEQ ID NO: 4), MKG (SEQ ID NO: 2) and ALPMH (SEQ ID NO: 3), in combination with at least one bioactive peptide selected from the group comprising SAP (SEQ ID NO: 1), VSLPEW (SEQ ID NO: 5), INYWL (SEQ ID NO: 6), LKPTPEGDLEIL (SEQ ID NO: 7) and LKGYGGVSLPEW (SEQ ID NO: 8).

The hydrolysed WPI product of the invention has one or more of the following features:
  antihypertensive ACE-I activity
  probiotic growth promoting activity
  non-gluey, non-bitter flavour
  pleasant to slightly sweet taste
  good organoleptic properties
  high solubility
  very good foaming properties
  very good gelling properties
  improved heat stability The application of the mild hydrolysis technology to the substrate of whey protein isolates (WPI) revealed some dramatic improvements of the final product in comparison to sweet whey protein concentrate (WPC) as a whey-protein containing substrate as disclosed in WO 99/65326 as follows:

Solubility
  Although the WPI still denatures slightly on the heat conditions to stop the protease reaction, it does not produce any insoluble material. The solubility remains around 96% which is greater than the corresponding WPC hydrolysate.

Heat Stability
  The hydrolysed WPI was significantly more heat stable than the hydrolysed WPC. After 120° C. for 10 min @ 5% TS the solubility remains 95%.

Appearance
  Proper selection of reaction conditions can determine whether the final hydrolysate will look white or clear in solution. Example 1, below, produces an opaque product, whilst Examples 2 and 3 (below) result in clear product in solution at neutral pH. Hydrolysates of WPC were all substantially white in appearance.

Foaming Ability and Stability
  The hydrolysed WPI shows about double the foaming ability and about four times the foam stability of non-hydrolysed WPI. This makes the product very suitable as an ingredient for yoghurt and dessert applications. The hydrolysed WPI also showed improved foaming ability and stability compared to a WPC hydrolysate.

Gel Strength
  The mildly hydrolysed WPI shows a markedly increased gel strength compared to non-hydrolysed WPI. This makes the product very suitable as an ingredient for yoghurt and dessert applications. The hydrolysed WPI also showed improved gel strength compared to a WPC hydrolysate.

Flavour
  The hydrolysed WPI shows significantly less bitterness compared to mildly hydrolysed WPC products. The bitterness shows no tendency to increase over time of hydrolysis, making the control of the process much easier in comparison to WPC hydrolysis.

ACE-I Activity in vitro
  The hydrolysed WPI shows about double the ACE-I activity in vitro of mildly hydrolysed WPC, given comparable; reaction conditions and enzyme addition.

Acceleration of Probiotic Fermentation

The hydrolysed WPI shows an acceleration in the rate of probiotic yoghurt fermentation time of about 40% at an addition rate of 1.5%.

The invention consists in the foregoing and also envisages constructions of which the following gives examples.

BRIEF DESCRIPTION OF THE DRAWINGS

The present invention will now be described with reference to the accompanying drawings in which.

DETAILED DESCRIPTION OF THE INVENTION

Figure 1:
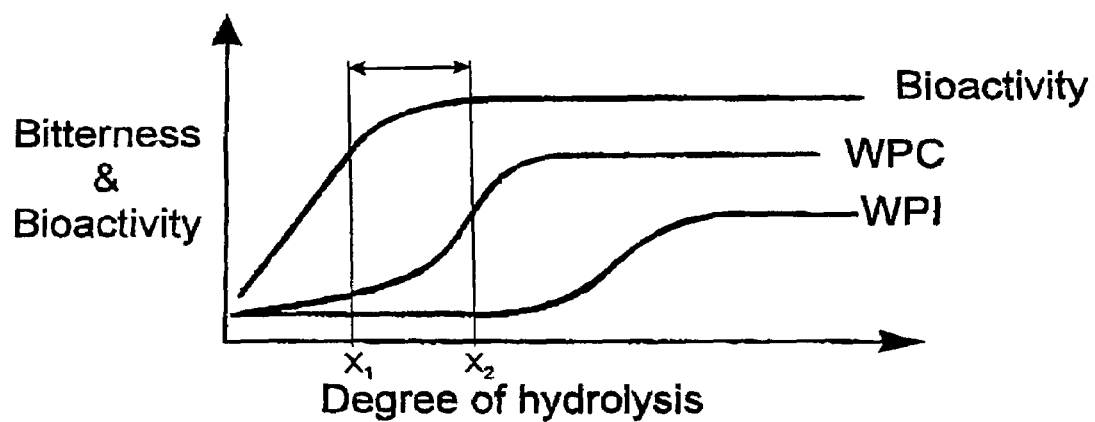
FIG. 1 is a plot of bitterness and bioactivity on the ordinant against the degree of hydrolysis on the abscissa. The 'opportunity window' of obtaining a product according to the present invention containing bioactive peptides and having acceptable flavour before the hydrolysis reaction produces bitter peptides is between the lines $x_1$ and $x_2$.

As discussed above, the present invention provides a process for producing a hydrolysed WPI product containing bioactive peptides, whereby the hydrolysis is carried out under a high degree of control to prevent undesirable flavours developing during hydrolysis (e.g. bitter, soapy and brothy). The hydrolysis is terminated within the "opportunity window", i.e. before the emergence of substantial bitterness—as shown in FIG. 1—to provide hydrolysates having good organoleptic properties and maximum bioactive peptides. In FIG. 1 the degree of hydrolysis is represented qualitatively on the x axis. The window of opportunity is between the points $x_1$ and $x_2$ which will vary depending on the enzyme which is used. The optimum conditions sought are a maximum bioactivity with an acceptable level of bitterness.

In particularly preferred embodiments of the process of the invention, the enzyme which hydrolyses the WPI is heat labile and is selected from the group consisting of Protease P6, Protease A, Protease M, Peptidase, Neutrase, Validase and AFP 2000 (all as herein defined) and the hydrolysis of the WPI is terminated by heat treatment for a short time at a high temperature (about 85–100° C. for about 1–10 seconds). The applicants have surprisingly found that the above enzymes (1) are able to produce a whey protein hydrolysate containing a good level of bioactive peptides, and (2) can be inactivated by a short time, high temperature treatment which causes only partial denaturation of the whey proteins in the hydrolysate, and surprisingly improves the organoleptic properties of the whey proteins, in terms of providing a product which is substantially white or clear in appearance.

The present invention is now exemplified by the following examples using ALACEN™ 895 or ALACEN™ 894 (whey protein isolates, commercially available from NZDB), the product specifications for which are attached in Appendix I:

EXAMPLE 1

Pilot Plant Production of WPI Mild Hydrolysate

Whey protein isolate produced by cation ion exchange technology (ALACEN™ 895) with a protein content ≧90% w/w was reconstituted at 20% total solids in water (50° C.) Reconstituted ALACEN™ 895 was transferred to a 150 L tank at 50° C. Water (50° C.) was added to the tank to make final total solids of 4%. The solution was stirred and Neutrase (E:S 0.9%) was added.

Two hours after enzyme addition the first hydrolysate was pumped through the UHT plant. Enzyme inactivation was achieved using direct steam injection to heat the hydrolysate to 88° C. and the hydrolysate was held it at this temperature for 1.5 seconds.

The hydrolysate was flash cooled and passed through shell and tube heat exchanges to cool to ambient temperature.

The hydrolysate was subsequently evaporated and dried.

A hydrolysate made following the process of Example 1 had the following features:

Solubility: 95%

Heat stability: 120° C. for 10 min @5% TS solubility 95%

ACE-I in vitro activity: 289 mg/L IC50

Foaming: Markedly increased over non-hydrolysed WPI

Flavour: Markedly improved over WPC based mild hydrolysates

Appearance: opaque white, particle size ~0.1 μm

The solubility, heat stability, foaming, and appearance of the WPI hydrolysate were measured by standard methods familiar to those skilled in the art. The solubility of 5% total solids (TS) solution was determined by centrifugation at 3000 g for 10 mins (at room temperature). The heat stability of 5% TS solutions was determined by heating to 120° C. for 10 mins, quick cooling, then centrifugation at 700 g for 10 mins. The TS contained in the supernatant and the original solution was determined. The solubility was defined as the TS(supernatant)/TS(original solution) Foaming of 10% TS solutions at pH 7.0 was determined by whisking with a Hobart mixer (Model N-50G, Hobart Corporation) for 15 mins. The percentage overrun was used to compare the sample as would be understood by a person skill in the art. The appearance of 5% TS was determined by visual observation and the particle size was measured using a Malvern MasterSizer (Model MSEOOSM, Malvern Instruments Ltd).

ACE-I activity (in vitro) in the dried product was determined using FAPGG as a substrate (Product 305–10 ex Sigma Chemical Corporation, St Louis, Mo., USA) according of the method of D W Cushman & H S Cheung (1971). ACE-I activities are expressed as the amount of material (mg/L) needed to reduce the activity of the ACE-I enzyme by 50%.

The flavour was assessed subjectively with reference to the bitterness and astringency of the hydrolysates, in particular, the sensory profile was assessed by a formal sensory panel. 5% w/w samples were tasted at 24° C. using multidimensional scaling. Samples were evaluated and scored on a 150 mm anchored line (absent (0) to intense (150)).

EXAMPLE 2

The hydrolysis reaction was repeated as outlined above for Example 1(10% total solids, E:S 0.9%, 150 L). After inactivation the hydrolysate was immediately evaporated and dried A hydrolysate made by this method had the following features which were measured as disclosed above for Example 1:

Solubility 97%

Heat stability: 120° C. for 10 min @5% TS solubility 96%

ACE-I in vitro activity: 503 mg/L IC50

Foaming: Markedly increased over non-hydrolysed WPI

Gelling: Markedly increased over non-hydrolysed WPI

Flavour: Markedly improved over WPC based mild hydrolyses

Appearance: clear yellowish

EXAMPLE 3

The hydrolysis reaction of Example 1 was repeated as outlined above (4% total solids, E:S 0.9%, 150 L). Four hours after enzyme addition the first hydrolysate was pumped through the UHT plant using the same conditions as in Example 1.

A hydrolysate made by is method had the following features which were measured as disclosed above for Example 1:

ACE-I in vitro activity: 230 mg/L IC50

Foaming: Markedly increased over non-hydrolysed WPI

Gelling: Markedly increased over non-hydrolysed WPI

Flavour: Markedly improved over WPC based mild hydrolysates

Appearance: clear yellowish

EXAMPLE 4

A 2% solution of ALACEN™ 89.4(micro-filtered WPI) was altered to pH 3.0 before undergoing ultrafiltration at 10° C. with a 3,000 Dalton nominal molecular weight cutoff membrane (CDUF001LB, Millipore Corporation, Bedford). The pH of the retentate was altered to 7.0 and diluted to 2% total solids before ultrafiltration at 10° C. with the same membrane used previously. The total solids of the retentate were adjusted to 5.0% before being hydrolysed with E:S 0.9% w/w Neutrase (Novo Nordisk, Denmark) at: 50° C. After 4 h the sample was inactivated at 88° C. for 3 seconds and subsequently freeze-dried. The ACE-I activity was determined to be 227 mg/L.

EXAMPLE 5

Mildly hydrolysed WPI from Example 3 was shown to promote the growth of a probiotic microorganism when added to half fat milk at an addition rate of 1.5%. The milk was heat treated @ 90° C. for 10 minutes. After cooling to 37° C. the milk was inoculated with 0.1% S. thermophilus and 2% L. rhamnosus HN001(DR20™). The fermentation time of the control was 20 h to reach the required pH of 4.4. In contrast, the WPI hydrolysate addition reduced the fermentation time to 13 h.

EXAMPLE 6

Identification of ACE-inhibitor Peptides in WPI Hydrolysates

The objective of this example was to isolate and identify ACE-inhibitor peptides present in the WPI hydrolysates Methodology The starting material for ACE-I peptide isolation was a UF permeate (10 kDa) obtained from the original hydrolysate of Example 1;

Peptides present in the hydrolysate were separated using reverse-phase HPLC;

Purified peptides were assayed individually for ACE-inhibitor activity as described in Example 1, The amino acid sequence of each active peptide was identified by a combination of mass spectrometry and N-terminal sequence analysis;

The origin of the active peptides was determined by comparing their sequences with the known sequences of the milk proteins.

The peptides, their origins, activities known similarities are set out in Table 1 below:

TABLE 1

ACE-inhibitor peptides isolated from a WPI hydrolysate

| Peptide | ACE-inhibitor sequence | Origin | [1]Activity (IC$_{50}$) |
|---|---|---|---|
| 1 | SAP (SEQ ID NO: 1) | β-LG(36–38) | 22 |
| 2 | [2]MKG (SEQ ID NO: 2) | β-LG(7–9) | 23 |
| 3 | [2]ALPMH (SEQ ID NO: 3) | β-LG(142–146) | 23 |
| 4 | [2]LIVTQ (SEQ ID NO: 4) | β-LG(1–5) | 19 |
| 5 | VSLPEW (SEQ ID NO: 5) | α-LA(21–26) | 8 |
| 6 | [3]INYWL (SEQ ID NO: 6) [3]LKPTPEGDLEIL (SEQ ID NO: 7) | α-LA(101–105) β-LG(46–57) | 11 |
| 7 | LKGYGGVSLPEW (SEQ ID NO: 8) | α-LA(15–26) | 7 |

[1]mg/L
[2]also detected in WPC hydrolysates of WO 99/65326.
[3]two peptides were present in the sample; one or both may be active peptides(s)
Three of the active peptides from the WPI hydrolysate were previously identified in the WPC hydrolysate i.e. β-LG(7–9), β-LG(142–146) and β-LG(1–5).

EXAMPLE 7

Sensory Comparison of Mildly Hydrolysed WPI Compared to Mildly Hydrolysed WPC and Unhydrolysed WPI WPI was hydolysed as set out above in Example 1.

WPC was hydrolysed as set out in Example 1 of WO 99/65326. (ALACEN™ 392, 10%, hydrolysed and inactivated after 2 hours).

ALATAL™ 819 is a commercial product of the New Zealand Dairy Board; the summary of the product specification of which is attached in Appendix I.

A taste panel scored the bitterness and astringency of the products scored on a 150 mm anchored line (absent (0) to intense (150)).

Degree of Hydrolysis was determined using the Modified O-phthaldialdehyde (MOPA) method as described by Frister et al. (1988).

TABLE 2

Mean score (/150) for WPI and hydrolysate samples evaluated by a formal sensory panel, degree of hydrolysis, and ACE-I activity of standard WPI and hydrolysed whey protein.

| Product tested | Sensory Evaluation | | Degree of Hydrolysis (%) | ACE-I activity (mg/L) |
| --- | --- | --- | --- | --- |
|  | Bitter | Astringent |  |  |
| ALACEN ™ 895 (WPI) | 36.2 | 24 | 0 | ~2000 |
| Mildly hydrolysed WPC | 78 | 67.1 | 4.5 | 440 |
| Mildly hydrolysed WPI | 55.1 | 41.6 | 4.3 | 230 |
| ALATAL ™ 819 | 93.1 | 53.3 | 10 | — |

Both mildly hydrolysed WPI, and mildly hydrolysed WPC were more bitter and astringent than the non-hydrolysed WPI product as expected. However, these products were significantly less bitter and astringent than a more vigorously hydrolysed ALATAL∩ 819 (a product of the New Zealand Dairy Board, NZ).

Mildly hydrolysed WPI products gave more acceptable flavoured products and had significantly higher ACE-I activity, compared to the mildly hydrolysed WPC (described in WO 99/65326). The results also showed that the mildly hydrolysed WPI was significantly less bitter and astringent than the equivalent WPC product, although the degree of hydrolysis for both was similar. As well as having a more acceptable flavour profile, the ACE-I activity of the mildly hydrolysed WPI was almost twice that of the mildly hydrolysed WPC.

Although further hydrolysis of WPC may result in an increased ACE-I activity, a significant decrease in the flavour profile compared to the mildly hydrolysed WPI is observed, compromising the flavour profile due to increased bitterness and astringency.

EXAMPLE 8

Blood Pressure Measurement

Blood pressure was measured using a tail cuff monitor and a purpose designed apparatus for measuring the blood pressure of small animals [IITC Inc, 239 Victory Blvd., Woodland Hills, Calif. 91367, USA]. Each time point was the average of 3–5 readings taken within approximately 5–10 minutes.

The Animal Strain

Spontaneously hypertensive rats (SHRs) were sourced from the Animal Resource Centre, Western Australia.

Sample Dosage

The test substances were given to each rat on a per kg body weight basis unless otherwise stated. The individual dose for each animal was incorporated into a flavoured jelly, which was readily consumed by the animals.

Figure 3:
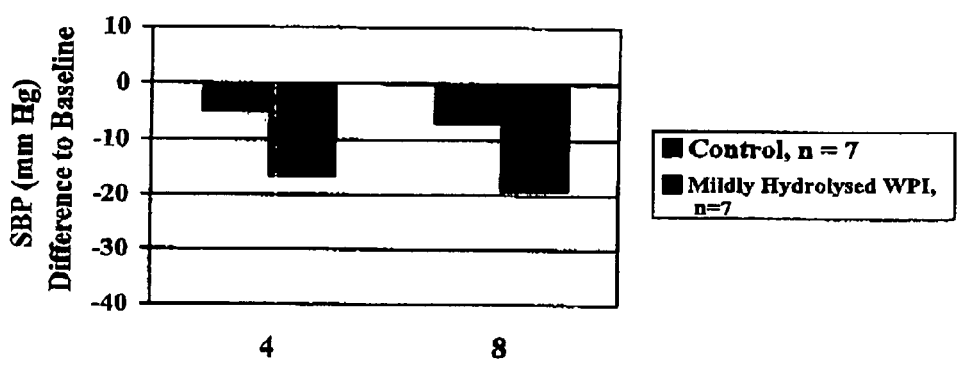
FIG. 3 shows the Acute Short Term Effect of Systolic Blood Pressure of dosing mature spontaneously hypertensive rates (SHRs) with 3.6 g WPI hydrolysate/kg body weight.
Figure 4:
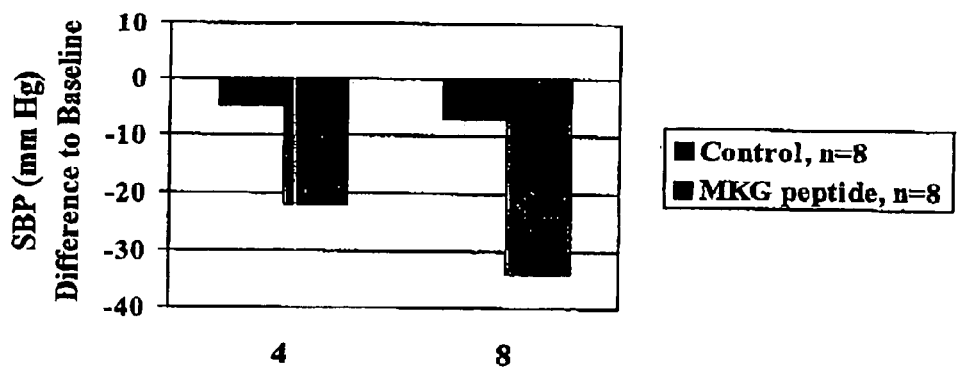
FIG. 4 shows the Acute Short Term Effect of Systolic Blood Pressure of dosing mature spontaneous hypertensive rates (SHRs) with 165 mg peptide MKG (SEQ ID NO: 2)/kg body weight.

The three samples evaluated for short tern blood pressure response were a mildly hydrolysed whey protein concentrate (FIG. 2), a mildly hydrolysed whey protein isolate (see FIG. 3) and a synthesised peptide from. Table 1, namely MKG (SEQ ID NO: 2) (see FIG. 4). The WPC was prepared according to the methodology set out in example 1 of WO 99/65326.

Acute or short term effects of agents were determined by treating adult SHRs with the agent and then studying their blood pressure responses over the following hours. The study detects if an agent lowers blood pressure that is already elevated.

Results

Figure 2:
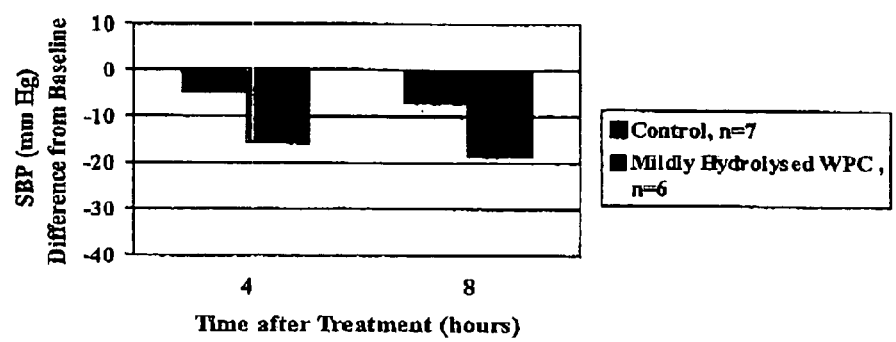
FIG. 2 shows the Acute Short Term Effect of Systolic Blood Pressure of dosing mature spontaneously hypertensive rates (SHRs) with 6.0 g WPC hydrolysate/kg body weight.

Short term dosing of SHRs with 3.6 g/kg body weight of WPI hydrolysate (FIG. 3) resulted in a significant reduction in blood pressure compared to controls rats (p=0.0378). The reduction in blood pressure was similar to that achieved in rats dosed with 6.0 g/kg body weight WPC hydrolysate (FIG. 2). Thus, the WPI hydrolysate appears to be more active than the comparative WPC hydrolysate so that approximately 50% less of the WPI hydrolysate is required to give a similar decrease in blood pressure (systolic) in mature SHRs.

Short term dosing of SHRs with 165 mg/kg body weight peptide MKG (FIG. 4) showed a much greater reduction in blood pressure compared to control rats (p=0.0021 after 4 hours; p<0.0001 after 8 hours) as well as compared to the mild WPI hydrolysate and mild WPC hydrolysate.

Conclusions

The process of mildly hydrolysing WPI according to the present invention provides useful WPI hydrolysates which show significant: functional improvement over the WPC hydrolysates of WO 99/65326. In particular, the present WPI hydrolysates comprise more active peptides with significantly less WPI hydrolysate required to decrease blood pressure in vivo to the same degree as a WPC hydrolysate WPI can be hydrolysed for longer without losing acceptable: flavor, characteristics and whilst maintaining the increased ACE-I activity. Thus, ova he process of the present invention provides a bioactive whey protein hydrolysate which is improved in flavour, ACE-I activity and functionality compared to that of WO 99/65326.

INDUSTRIAL APPLICATION

The process of the present invention is useful to produce the novel whey protein hydrolysate which has surprising beneficial properties and can be used as a food or medicine as an anti-hypertensive.

It will be appreciated that it is not intended to limit the invention to the aforementioned examples only, many variations, such as might readily occur to a person skilled in the art, being possible, without departing from the scope of the appended claims.

REFERENCES

Bernal V & Jelen P (1989). Effectiveness of lactose hydrolysis in Cottage cheese whey for the development of whey drinks. *Milchwissenchaft* 44: 222–225

FR 2309154, 30 Dec. 1976 Fromageries Bel La Vache Qui (From), France.

U.S. Pat. No. 3,970,520, 20 Jul. 1976, General Electric Co, USA.

EP0117047, 29 Aug. 1984, General Foods Corporation, USA.

Maubois J L, Léonil J, Trouvé R & Bouhallab S(1991) Les peptides du lait à activité physiologique III. Peptides du lait à effect cardiovasculaire: activités antithrombotique et antihypertensive. *Lait,* 71, 249–255.

JP 4282400, 7 Oct. 1992, Calpis Shokuhin Kogyo KK, Japan.

EP065663, 1 Dec. 1982, Miles Laboratories Incorporated, USA.

JP 8056568, 17 Aug. 1994. Morinaga Mil Co Ltd Japan.

EP4745506, 11 Mar. 1992, Morinaga Milk Co Ltd, Japan.

Mullally M M, Meisel H & FitzGerald R J (1997) Identification of a novel angiotensin-I-converting enzyme inhibitory peptide corresponding to a tryptic fragment of bovine β-lactoglobulin. *Federation of European Biochemical Societies Letters,* 402, 99–111.

Nakamura Y, Yamamoto N, Sakai K & Takano T (1994). Antihypertensive effect of the peptides derived from casein by an extracellular proteinase from *Lactobacillus helveticus* CP790. *Journal of Dairy Science,* 77, 917–922.

Roy G (1992). Bitterness: reduction: and inhibition. *Trends in Food Science and Technology* 3: 85–91

Roy G (1997). Modifying bitterness: Mechanism, ingredients and applications. Technomic Publishers, Lancaster, UK.

U.S. Pat. No. 4,358,464, 9 Sep. 1982, Superior Dairy Company, USA.

Yamamoto N (1997). Antihypertensive peptides derived from food proteins. *Biopolymers* 43: 129–134.

Frister H, Meisel H & Schelimme E (1988). OPA method modified by use of N,N-dimethyl-2-mercaptoethylammoniumchloride as thiol component. *Freesenius Z Anal Chem.* 330, 631–633

Cushman D W & Cheung H S (1971). Spectrophotometric assay and properties of the angiotension converting enzyme in rabbit lung. Biochem Pharmocol 20: 1637–1648.

WO 9965326, 23$^{rd}$ Dec., 1991, New Zealand Dairy Board, NZ.

What we claim is:

1. A process for preparing an improved whey protein hydrolysate containing bioactive peptides comprising hydrolysing a whey protein isolate (WPI) with one or more enzymes characterized in that:
   i) at least one of the enzymes is a bacterial protease from *Bacillus amyloliquefaciens* and the enzyme to substrate ratio is between about 0.01% and about 3% w/w total solids;
   ii) the hydrolysis is conducted at a temperature of between about 30° C. and 65° C. and at a pH of about 3.5 to about 9.0;
   iii) the hydrolysis is terminated when a degree of hydrolysis of no greater than about 10% has been reached;
   iv) the hydrolysis is terminated by deactivating said one or more enzymes; and
   wherein the product of the process is water soluble.

2. A process as claimed in claim 1, wherein said enzyme deactivating step iv) comprises heat deactivation.

3. A process as claimed in claim 2, wherein said heat deactivation comprises heating said hydrolysate for up to ten seconds to a temperature up to about 100° C.

4. A process as claimed in claim 2, wherein, when said hydrolysis is conducted at a temperature of below about 65° C., said heat deactivating step is conducted at about 65° C. to about 70° C. for from about 10 seconds to about 15 minutes.

5. A process as claimed in claim 2, wherein, when said hydrolysis is conducted at a temperature below about 60° C., said heat deactivating step is conducted at about 60° to about 65° C. for from about 10 seconds up to about 30 minutes.

6. A process as claimed in claim 1, wherein said enzyme deactivating step comprises altering the pH of said whey protein-containing substrate to a pH at which the bacterial protease is not active.

7. A process as claimed in claim 6, wherein said enzyme deactivating step includes heat deactivation.

8. A process as claimed in claim 1, wherein said enzyme deactivating step iv) comprises subjecting said hydrolysate to ultrafiltration with an ultrafiltration membrane having a nominal molecular weight cutoff in the range of about 10–500 kDa.

9. A process as claimed in claim 8, wherein said ultrafiltration membrane has a nominal molecular weight cut off in the range of about 10–200 kDa.

10. A process as claimed in claim 1, wherein said enzyme is immobilised on an inert support during said hydrolysis step ii).

11. A process as claimed in claim 10, wherein said inert support is Roehm Eupergit, carrageenan particles, chitosan particles or any other suitable inert support material.

12. A process as claimed in claim 1, wherein the degree of hydrolysis is from about 3% to about 10%.

13. A process as claimed in claim 12, wherein the degree of hydrolysis is from about 3% to about 5%.

14. A process as claimed in claim 1, wherein the whey protein hydrolysate so produced comprises one or more bioactive peptides selected from the group consisting of SAP (SEQ ID NO: 1), MKG (SEQ ID NO: 2), ALPMH (SEQ ID NO: 3), LIVTQ (SEQ ID NO: 4), VSLPEW (SEQ ID NO: 5), INYWL (SEQ ID NO: 6), LKPTPEGDLEIL (SEQ ID NO: 7) and LKGYGGVSLPEW (SEQ ID NO: 8).

15. A process as claimed in claim 1, wherein the whey protein hydrolysate so prepared comprises at least one bioactive peptide selected from the group consisting of LIVTQ (SEQ ID NO: 4), MKG (SEQ ID NO: 2) and ALPMH (SEQ ID NO: 3), in combination with at least one bioactive peptide selected from the group comprising SAP (SEQ ID NO: 1), VSLPEW (SEQ ID NO: 5), INYWL (SEQ ID NO: 6), LKPTPEGDLEIL (SEQ ID NO: 7) and LKGYG-GVSLPEW (SEQ ID NO: 8).

16. A pharmaceutical composition comprising one or more bioactive peptides produced by the process of claim 1 together with a pharmaceutically acceptable carrier, wherein the one or more bioactive peptides are selected from the group consisting of SAP (SEQ ID NO: 1), VSLPEW (SEQ ID NO: 5), INYWL (SEQ ID NO: 6), LKPTPEGDLEIL (SEQ ID NO: 7) and LKGYGGVSLPEW (SEQ ID NO: 8).

17. A pharmaceutical composition as claimed in claim 16, additionally comprising at least one bioactive peptide selected from the group consisting of LIVTQ (SEQ ID NO: 4), MKG (SEQ ID NO: 2) and ALPMH (SEQ ID NO: 3).

18. A method of treating or preventing hypertension in a mammal, said method comprising administering an effective amount of a WPI hydrolysate produced according to the process of claim 1 to a mammal in need thereof.

19. A non-bitter, water soluble WPI hydrolysate product containing bioactive peptides, prepared by the process of claim 1.

20. A product as claimed in claim 19, wherein the degree of hydrolysis of the WPI is about 3% to about 5%.

21. A product as claimed in claim 20, wherein the main particle size of whey proteins in the product is less than about 30 microns.

22. A product as claimed in claim 21, wherein the main particle size is less than about 3 microns.

23. A product as claimed in claim 19, which is substantially clear or white in solution.

24. A product as claimed in claim 19, wherein one or more of said bioactive peptides is selected from the group consisting of SAP (SEQ ID NO: 1), MKG (SEQ ID NO: 2), ALPMH (SEQ ID NO: 3), LIVTQ (SEQ ID NO: 4), VSLPEW (SEQ ID NO: 5), INYWL (SEQ ID NO: 6), LKPTPEGDLEIL (SEQ ID NO: 7) and LKGYGGVSLPEW (SEQ ID NO: 8).

25. A product as claimed in claim 19, comprising at least one bioactive peptide selected from the group consisting of LIVTQ (SEQ ID NO: 4), MKG (SEQ ID NO: 2) and ALPMH (SEQ ID NO: 3), in combination with at least one bioactive peptide selected from the group comprising SAP (SEQ ID NO: 1), VSLPEW (SEQ ID NO: 5), INYWL (SEQ ID NO: 6), LKPTIEGDLEIL (SEQ ID NO: 7) and LKGYG-GVSLPEW (SEQ ID NO: 8).

26. A food product containing a WPI hydrolysate product as claimed in claim 19.

27. A method of reducing systolic blood pressure in a subject comprising administering an effective amount of a WPI hydrolysate prepared by the process of claim 1 or food product containing said hydrolysate to a patient in need thereof.

28. A pharmaceutical composition comprising the product of claim 19 together with a pharmaceutically acceptable carrier.

29. Any one or any combination of two or more peptides selected from the group consisting of SAP (SEQ ID NO: 1), VSLPEW (SEQ ID NO: 5), INYWL (SEQ ID NO: 6), LKPTPEGDLEIL (SEQ ID NO: 7) and LKGYGGVSLPEW (SEQ ID NO: 8).

30. Any one bioactive peptide selected from the group consisting of LIVTQ (SEQ ID NO: 4), MKG (SEQ ID NO: 2) and ALPMH (SEQ ID NO: 3), in combination with at least one bioactive peptide selected from the group comprising SAP (SEQ ID NO: 1), VSLPEW (SEQ ID NO: 5), INYWL (SEQ ID NO: 6), LKPTIEGDLEIL (SEQ ID NO: 7) and LKGYGGVSLPEW (SEQ ID NO: 8).

31. A method of treating or preventing hypertension in a mammal, said method comprising administering an effective amount of a pharmaceutical composition comprising one or more bioactive peptides produced by the process of claim 1 together with a pharmaceutically acceptable carrier, wherein the one or more bioactive peptides are selected from the group consisting of SAP (SEQ ID NO: 1), VSLPEW (SEQ ID NO: 5), INYWL (SEQ ID NO: 6), LKPTPEGDLEIL (SEQ ID NO: 7) and LKGYGGVSLPEW (SEQ ID NO: 8).

32. A method of treating or preventing hypertension in a mammal, said method comprising administering an effective amount of a pharmaceutical composition comprising one or more bioactive peptides produced by the process of claim 1 together with a pharmaceutically acceptable carrier, wherein the one or more bioactive pentides are selected from the group consisting of SAP (SEQ ID NO: 1), VSLPEW (SEQ ID NO: 5), INYWL (SEQ ID NO: 6), LKPTPEGDLEIL (SEQ ID NO: 7) and LKGYGGVSLPEW (SEQ ID NO: 8), the pharmaceutical composition additionally comprising at least one bioactive peptide selected from the group consisting of LIVTQ (SEQ ID NO: 4), MKG (SEQ ID NO: 2) and ALPMH (SEQ ID NO: 3).

* * * * *

UNITED STATES PATENT AND TRADEMARK OFFICE
CERTIFICATE OF CORRECTION

PATENT NO. : 7,148,034 B2
APPLICATION NO. : 10/070406
DATED : December 12, 2006
INVENTOR(S) : Ralf-Ch Schlothauer et al.

It is certified that error appears in the above-identified patent and that said Letters Patent is hereby corrected as shown below:

On the title page item (75), line 2, please delete "Palmerston North" and insert --Emmelsbuell--, therefor.

In Col. 2, line 6, please delete "eyes" and insert --enzymes--, therefor.

In Col. 2, line 53 (approx.), please delete "mid" and insert --mild--, therefor.

In Col. 3, line 29, please delete "thee" and insert --the--, therefor.

In Col. 3, line 37 (approx.), please delete "hat" and insert --that--, therefor.

In Col. 3, line 52 (approx.), please delete "Validaise," and insert --Validase,--, therefor.

In Col. 3, line 64, please delete "5060°" and insert --50-60°--, therefor.

In Col. 4, line 1, please delete "support;" and insert --support--, therefor.

In Col. 4, line 17, please delete "deactivate" and insert --deactivating--, therefor.

In Col. 5, line 25, please delete "NO: 4)," and insert --NO: 1),--, therefor.

In Col. 5, line 40, please delete "flier" and insert --further--, therefor.

In Col. 6, line 67, please delete "comparable;" and insert --comparable--, therefor.

In Col. 7, line 16 (approx.), please delete "flavour" and insert --flavours--; therefor.

In Col. 7, line 17 (approx.), please delete "$x_1$," and insert --$x_1$--, therefor.

In Col. 8, line 46 (approx.), please delete "solution)" and insert --solution).--, therefor.

UNITED STATES PATENT AND TRADEMARK OFFICE
CERTIFICATE OF CORRECTION

PATENT NO. : 7,148,034 B2
APPLICATION NO. : 10/070406
DATED : December 12, 2006
INVENTOR(S) : Ralf-Ch Schlothauer et al.

It is certified that error appears in the above-identified patent and that said Letters Patent is hereby corrected as shown below:

In Col. 8, line 53 (approx.), please delete "MSEOOSM," and insert --MSE00SM,--, therefor.

In Col. 9, line 11 (approx.), after "Solubility" insert -- : --.

In Col. 9, line 18 (approx.), please delete "hydrolyses" and insert --hydrolysates--, therefor.

In Col. 9, line 30 (approx.), please delete "is" and insert --this--, therefor.

In Col. 9, line 43 (approx.), please delete "89.4" and insert --894--, therefor.

In Col. 9, line 52 (approx.), please delete "at:" and insert --at--, therefor.

In Col. 10, line 16 (approx.), please delete "Example 1," and insert --Example 1;--, therefor.

In Col. 10, line 23, after "activities", please insert --and--.

In Col. 11, line 15 (approx.), please delete "WPI," and insert --WPI--, therefor.

In Col. 11, line 19 (approx.), please delete "ALATAL∩" and insert --ALATAL™--, therefor.

In Col. 11, line 56, please delete "tern" and insert --term--, therefor.

In Col. 11, line 59, please delete "from." and insert --from--, therefor.

In Col. 12, line 20 (approx.), please delete "significant:" and insert --significant--, therefor.

In Col. 12, lines 26-27 (approx.), please delete "acceptable: flavor," and insert --acceptable flavour--, therefor.

UNITED STATES PATENT AND TRADEMARK OFFICE
CERTIFICATE OF CORRECTION

PATENT NO. : 7,148,034 B2
APPLICATION NO. : 10/070406
DATED : December 12, 2006
INVENTOR(S) : Ralf-Ch Schlothauer et al.

It is certified that error appears in the above-identified patent and that said Letters Patent is hereby corrected as shown below:

In Col. 12, line 28 (approx.), please delete "ova he" and insert --overall, the--, therefor.

In Col. 12, line 64, please delete "Mil" and insert --Milk--, therefor.

In Col. 12, line 64, please delete "111" and insert --101--, therefor.

In Col. 13, line 8, please delete "reduction:" and insert --reduction--, therefor.

In Col. 14, line 3, please delete "Schelimme" and insert --Schlimme--, therefor.

In Col. 18, line 34, Claim 32, please delete "pentides" and insert --peptides--, therefor.

Signed and Sealed this

Twenty-ninth Day of May, 2007

JON W. DUDAS
*Director of the United States Patent and Trademark Office*

SEQUENCE LISTING

```
<160> NUMBER OF SEQ ID NOS: 8

<210> SEQ ID NO 1
<211> LENGTH: 3
<212> TYPE: PRT
<213> ORGANISM: Bos taurus

<400> SEQUENCE: 1

Ser Ala Pro
1

<210> SEQ ID NO 2
<211> LENGTH: 3
<212> TYPE: PRT
<213> ORGANISM: Bos taurus

<400> SEQUENCE: 2

Met Lys Gly
1

<210> SEQ ID NO 3
<211> LENGTH: 5
<212> TYPE: PRT
<213> ORGANISM: Bos taurus

<400> SEQUENCE: 3

Ala Leu Pro Met His
1               5

<210> SEQ ID NO 4
<211> LENGTH: 5
<212> TYPE: PRT
<213> ORGANISM: Bos taurus

<400> SEQUENCE: 4

Leu Ile Val Thr Gln
1               5

<210> SEQ ID NO 5
<211> LENGTH: 6
<212> TYPE: PRT
<213> ORGANISM: Bos taurus

<400> SEQUENCE: 5

Val Ser Leu Pro Glu Trp
1               5
```

```
<210> SEQ ID NO 6
<211> LENGTH: 5
<212> TYPE: PRT
<213> ORGANISM: Bos taurus

<400> SEQUENCE: 6

Ile Asn Tyr Trp Leu
1               5

<210> SEQ ID NO 7
<211> LENGTH: 12
<212> TYPE: PRT
<213> ORGANISM: Bos taurus

<400> SEQUENCE: 7

Leu Lys Pro Thr Pro Glu Gly Asp Leu Glu Ile Leu
1               5                   10

<210> SEQ ID NO 8
<211> LENGTH: 12
<212> TYPE: PRT
<213> ORGANISM: Bos taurus

<400> SEQUENCE: 8

Leu Lys Gly Tyr Gly Gly Val Ser Leu Pro Glu Trp
1               5                   10
```